United States Patent Office 3,047,430
Patented July 31, 1962

3,047,430
COUNTERCURRENT EXTRACTION PROCESSES
Alan E. Goodban, Walnut Creek, and John B. Stark, Berkeley, Calif., assignors to the United States of America as represented by the Secretary of Agriculture
Filed May 26, 1961, Ser. No. 113,042
3 Claims. (Cl. 127—45)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes is hereby granted to the Government of the United States of America.

This invention relates to and has among its objects the provision of novel methods for conducting extractions. A general object of the invention is the provision of means for conducting extractions more efficiently and effectively. A particular object is the provision of processes for extracting vegetable materials, typically sugar beets, to yield juices having a decreased content of undesirable dissolved material such as mineral salts. Another particular object is the provision of processes whereby the aforesaid materials can be efficiently and effectively extracted with waters containing mineral salts, including waters so highly loaded with minerals as to have been previously thought to be impracticable for such use. Another object is the provision of processes whereby the aforesaid materials can be extracted to obtain a greater recovery of desired constituents, especially sugar. Further objects and advantages of the invention will be apparent from the following description wherein parts and percentages are by weight unless otherwise specified.

Figure 1:
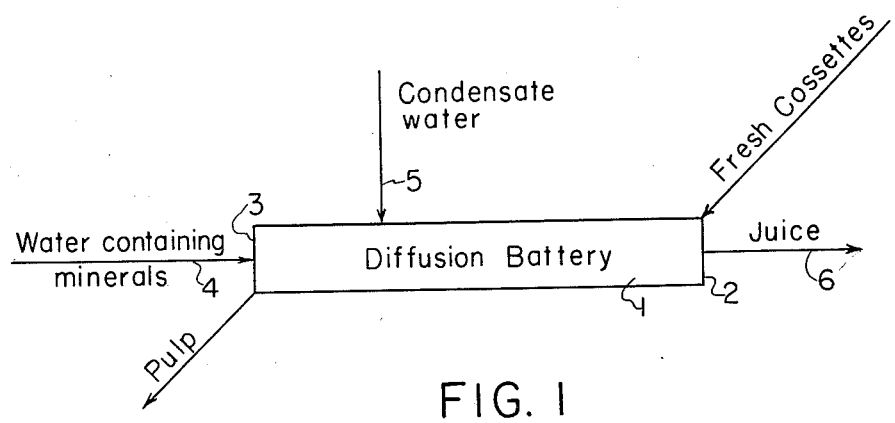
Figure 2:
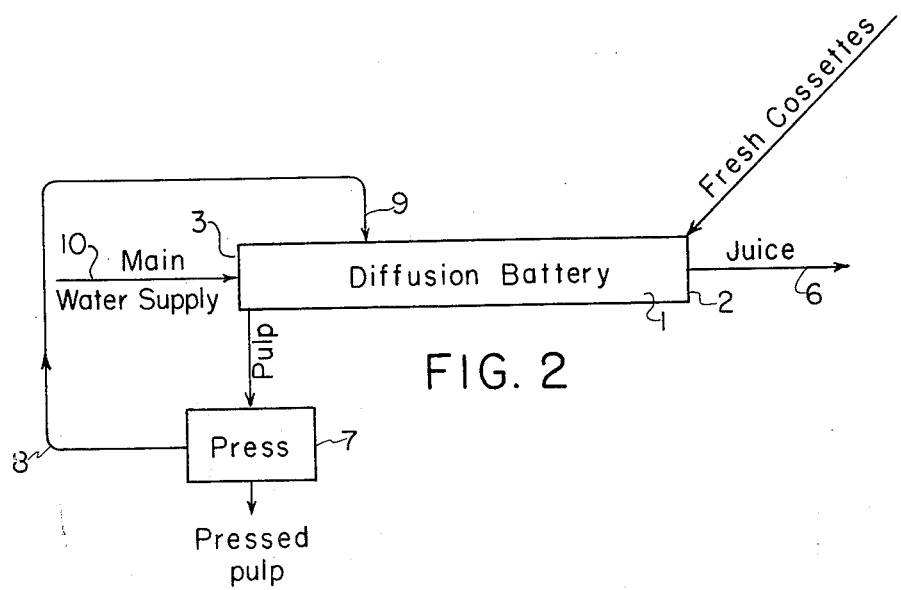

In the drawing annexed hereto, FIGURES 1 and 2 are schematic representations or flow-sheets illustrating two embodiments of the invention.

The invention is of particular advantage in the processing of sugar beets and its application in this field is emphasized in the following description. It is, however, to be understood that the invention is not limited to sugar beets but is applicable to extraction of any kind of material of the vegetable kingdom and particularly sugar-containing vegetable materials such as sorghum, sugar cane and the like, as well as sugar beets.

In the conventional production of sugar from sugar beets, the beets are are first washed, trimmed, and cut into strips known as cossettes. These cossettes are then extracted with water to cause a diffusion or translocation of sugar from the beet tissue into the water phase. This extraction process is generally referred to as diffusion and the latter term will accordingly be used herein. The diffusion is universally carried out continuously in a countercurrent system. Thus there is provided an apparatus, generally termed a diffusion battery, which provides a vessel for holding the beets and water and which is also equipped with such mechanical contrivances as drag chains, rakes, or helical screws or scrolls for propelling the beet material through the system. In operation, the cossettes are introduced at the head end of the battery while water is introduced at the tail end thereof. These two materials progress through the battery in opposite directions and the spent cossettes—usually termed pulp—are discharged at the tail end of the battery whereas sugar-containing juice is discharged at the head end. The resulting juice is then purified and subjected to evaporation and crystallization to obtain pure crystalline sugar. By-products of the process are the pulp and the mother-liquor (molasses) from the crystallization; the latter contains non-crystallizable sugars and various components of a non-sugar nature such as amino acids, mineral salts, etc.

One of the problems encountered in commercial operations is that the water available for the diffusion contains dissolved impurities, typically such mineral salts as are commonly present in well and river waters. Since these impurities are dissolved in the water supplied to the diffusion batteries, a substantial proportion thereof remains in the aqueous phase during the diffusion and is thus present in the sugar-containing juice issuing from the battery. The presence of these minerals is highly undesirable as they inhibit crystallization of sugar and hence decrease the yield of this desired product. The sugar which is thus prevented from crystallizing remains in the molasses and can be recovered only by complex and expensive purification procedures. Among the minerals which are particularly prone to inhibit crystallization of sugar are potassium, sodium, chloride, sulphate, and nitrate ions. An especially undesirable ion is chloride and various investigators in this field have reported that a unit weight of chloride ion will inhibit the crystallization of 5 to 7 times its weight of sugar. The influence of saline waters on sugar production is discussed by Muhlpforte [Wasserwirtschaft-Wassertechnik, vol. 9, pp. 348–349 (1959)] who states that where saline water is used in the diffusion, ⅓ of the total amount of salt introduced in the battery supply water will be found in the juice. He estimates that if a plant is required to use for diffusion water containing 500 mg. per liter of chloride, there will be a decrease in sugar yield of 0.2% (calculated on beets) or, expressed in another way, in a factory which processes 80,000 tons of beets in a campaign, there will be a loss of 160 tons of sugar.

Although the crystallization-inhibiting effect of mineral salts is well known, processors are usually compelled for reasons of economics and/or location to employ such water for at least part of the total amount of water supplied to their diffusion batteries. Ordinarily the main water sources available at a beet sugar plant are (1) water containing mineral salts obtained from wells, rivers, or the like and (2) relatively pure water obtained by condensing steam evolved in various pieces of equipment in the plant, such as evaporators, heat exchangers, steam ejectors etc. Another source used in some plants is press water which is produced by pressing the beet pulp that is discharged from the diffusion batteries. In conventional operations, these sources are combined, using as little of the mineral-containing water as possible to provide the total amount needed for the beet diffusion. It is obvious that in actual plant operation it is impossible to conserve enough condensate water to carry out the diffusion, even with addition of press water and it is always necessary to make up the loss with the mineral-containing water. For reasons explained above, the greater the amount of mineral salts thus introduced into the batteries, the greater will be the loss of crystalline sugar.

In accordance with the invention, the problems outlined above are obviated by a novel system of introducing the total water required for the diffusion. This novel system involves introducing the water supplies of different purities into the diffusion battery as separate streams and at different locations. The manner in which this principle is applied in various situations is explained below.

In a typical situation where there is available (1) a source of relatively pure water such as condensate and (2) a source of relatively impure water such as well water, river water, or other water containing mineral salts, the impure water is introduced into the battery at a point where it will contact the cossettes just before they leave the battery. This would ordinarily be at the tail end of the battery. The pure water is not mixed with the impure water but is separately introduced into the battery at a point spaced from the tail end in the direction toward the head end of the battery. In this way the cossettes in the rear section of the battery (near the tail end) will be contacted with an aqueous phase containing a relatively high content of mineral salts and a substantial proportion of these salts will diffuse into the beet tissue. Since, moreover, the cossettes are moving toward the tail end to the discharge point, they carry this mineral material out of the system as they leave the battery. In effect, the principle of the process is that the cossettes on the point of leaving the system are used as carriers to take the minerals out of the battery. As a direct result, the amount of mineral matter which finds its way into the juice product is substantially decreased; in typical cases, reduced by 70% or more. It is further to be observed that this mechanism or pattern of action is entirely different from that which takes place in conventional operation. Thus in the usual procedure the mineral-laden and pure water sources are mixed and introduced as a single stream into the tail end of the battery. In such a situation the mineral concentration at the tail end of the battery is reduced by the dilution with condensate and hence the driving potential which controls diffusion of the minerals into the beet tissue is decreased. As a net result only a limited proportion of mineral material diffuses into the outgoing cossettes. In contrast, in our process the undiluted mineral-laden water contacts the outgoing cossettes and hence there is a high driving potential and a large proportion of the mineral material diffuses into these cossettes and is removed from the system. A particular advantage of the invention is its simplicity in that adoption of the invention merely requires a change in the location of the water inlets to the diffusion battery; otherwise the process is carried out as conventional in the industry. However, despite the simplicity of our system it causes a profound and desirable change in result as explained above and as exemplified in a further section of this description.

As explained above, when applying the process of the invention in a situation where there is available a source of relatively pure water and a source of relatively impure water, the latter is introduced at the tail end of the diffusion battery and the pure water is separatively introduced at a point spaced from the tail end. The particular point at which this pure water stream is to be introduced will vary, depending on several factors including the amount of mineral material in the impure water stream, the concentration of minerals which can be tolerated in the juice product, the amount of sugar to be dissolved in the juice, the relative amounts of pure and impure water available for diffusion, the draft under which the system is to be operated, etc. A basic consideration is that as the pure water inlet is successively spaced farther from the tail end of the battery, the amount of minerals which appears in the juice is correspondingly diminished. Conversely, as the pure water inlet is moved toward the tail end, the amount of minerals in the juice is increased. There is, however, another trend to be taken into consideration. This is the fact that extraction of sugar from the beets is at a maximum when the pure water inlet is at the tail end and the efficiency of sugar extraction decreases as the pure water inlet is successively spaced farther from the tail end. Accordingly, it is necessary to strike a balance between the degree to which it is desired to reduce the mineral content of the juice and the amount of sugar which is to be extracted from the beets. This balance can be achieved by pilot trials in which the pure water inlet is located at different points along the length of the diffusion battery and the location is then selected which provides a net advantage, that is, wherein one obtains a juice from which more crystalline sugar can be obtained than could be achieved if the two streams were jointly introduced at the tail end. (As explained hereinafter, a substantial decrease in the total amount of sugar extracted will cause no real disadvantage because the accompanying reduction in mineral content of the juice will more than make up for this apparent loss in that a higher yield of crystalline sugar will still be obtained.) Another factor which affects the position of the pure water inlet is the relative amounts of pure and impure water available. Other factors being constant, as the ratio of pure water to impure water increases the pure water inlet is spaced closer to the tail end, and vice versa. Another factor is the amount of minerals in the impure water source. With other conditions equal, an increase in mineral content will require that the pure water inlet be spaced farther from the tail end. Conversely, decrease in mineral content will call for the pure water inlet to be spaced closer to the tail end. There is also the matter of draft to be considered, that is, the total amount of water supplied to the diffusion battery. (Draft is usually expressed as the weight of juice dvided by the weight of beets.) With a low draft, the pure water inlet can be spaced closer to the tail end than in a situation with a higher draft, both yielding the same amount of minerals in the juice product. In view of the many inter-related factors governing the position of the pure water inlet, it is evident that the position thereof cannot be stated in any fixed terms. In any particular situation, given certain water sources of known purities and amounts, the optimum position for the pure water inlet can be selected by conducting pilot trials wherein this inlet is successively spaced at different points with assays made of the sugar and mineral content of juice produced at each spacing, followed by fixing of the inlet at the point which forms a juice product which yields the most crystalline sugar.

It is of course obvious that where a conventional diffusion process is modified to convert it into an operation in accordance with this invention, that is, the incoming streams of water are split as described above and the process otherwise carried out under the same conditions and in the same apparatus, the outgoing pulp will contain a larger proportion of sugar than with the conventional process. In effect, the efficiency of sugar extraction from the cossettes will be reduced. This is an inevitable result since in operating in accordance with the invention, the full supply of water is not immediately applied at the tail end of the battery. Expressed in another way, the tail portion of the battery is operated at less than its normal capacity. This decreased sugar extraction is, however, only an apparent disadvantage; it is not a disadvantage in fact. The important point to be considered is the crystallizaiton-inhibiting activity of mineral salts whereby a unit weight of mineral matter will prevent crystallization of an amount of sugar several times that weight. Accordingly, even though there is some reduction in the total amount of sugar extracted from the cossettes, the amount of sugar which can be crystallized from the juice will be increased because of reduction in the amount of crystallization-inhibiting minerals in the juice. In other words, the reduction in mineral content far overbalances the apparent loss of sugar and actually provides more crystalline sugar.

A typical plan for utilizing the embodiment of the invention described above is explained as follows, having reference to FIG. 1 of the annexed drawing. In this figure, the diffusion battery 1 is shown schematically—it may in practice be any conventional form of diffusion battery such as a U-shaped trough provided with a helical screw or it may be a series of cells provided with piping and chains or rakes for moving the liquid and beets, respectively.

The fresh cossettes to be extracted are introduced in the usual way at the head end 2 of the battery and the spent cossettes are removed at the tail end 3. The impure water, for example well water containing minerals, is introduced at the tail end 3 of the battery through conduit 4. The pure water, for example condensate, is introduced into the battery through conduit 5 spaced from the tail end a distance of about 10 to 25% the total length of the battery. The sugar-containing juice is removed from the system in the conventional way at the head end through conduit 6.

It is obvious from the foregoing explanation that the process of the invention provides a truly practical advantage in that one is enabled to obtain sugar-containing juices of decreased mineral content (hence providing more crystalline sugar) by using water supplies as conventional in the industry. However, it is further to be emphasized that the effect of our process is so marked and far-reaching that it enables the use of waters which have previously been thought to be useless for diffusion of sugar beets. Thus the process of the invention may be employed where the make-up water at the plant is strongly saline—even brackish waters or sea water. It is not contended that using highly saline waters will give better results than ordinary hard waters but by applying the principles of the invention they can be used successfully so that plants embodying the principles of the invention may be located in areas where only saline make-up water is available.

In the previous explanation, it has been assumed that the diffusion will be conducted with two sources of water—one relatively pure and one relatively impure. It is obvious, however, that the invention is not restricted to such circumstances but can be applied in situations where a series of waters of different purities are available. This may occur where a plant receives water from several sources such as different wells, springs, or the like. Adaptation of the invention to such conditions follows the principles already described: Assuming there is available a series of waters of decreasing mineral content $a$, $b$, $c$, $d$, etc., the worst water ($a$) is introduced at the tail end of the battery. The other waters are introduced at inlets spaced successively farther from the tail end in the order $b$, $c$, $d$, etc.

A further matter to be considered is that in some plants it is customary to use press water to supply part of the total water required for the diffusion. In customary practice, the press water is simply commingled with the condensate water and make-up water. In operating in accordance with the invention, the press water is added to the relatively impure water and this composite stream is introduced into the batteries at the tail end while the relatively pure water (condensate)) is introduced separately at a point spaced from the tail end as previously described.

In the foregoing discussion, we have stressed the effective use of water containing undesirable dissolved material such as minerals. The principles of the invention can, moreover, be applied to systems for effectively utilizing waters containing desirable dissolved material such as sugar. A typical situation involved in this modification of the invention is the efficient use of press water in the diffusion of sugar beets. (Press water contains a small proportion of sugar and is obtained by pressing the wet pulp or spent cossettes as they leave the diffusion batteries.) It is of course known that press water may be used in diffusion and in conventional practice it is simply mixed with the condensate and make-up water which is supplied to the diffusers. In accordance with this modification of the invention, the press water is not mixed in this way but is introduced into the battery separately and at a point spaced from the tail end of the battery. By doing this a more efficient extraction of sugar from the beets is attained. Thus in accordance with our invention, the press water is not merely used as a source of water but it is effectively utilized to increase sugar extraction so that the discharged pulp contains less sugar than in conventional operations. This embodiment of the invention is further explained as it would be applied in a system where the total water for diffusion includes ($a$) press water and ($b$) a main source of water including condensate plus added make-up water. (This embodiment of the invention is particularly adapted for situations where the available make-up water contains at most a conventional degree of hardness so that it is generally adapted for use in conventional diffusion procedures.) In applying the invention to such a system the main water source is introduced at the tail end of the diffusion battery while the press water is separately introduced at a point spaced from the tail end. This point is ordinarily one at which the cossettes in the diffuser contain a higher concentration of sugar than that contained in the incoming press water. Preferably, the press water inlet is not spaced beyond the point where the cossettes contain about twice as much sugar as contained in the press water. In such operation there is set up a pressure differential in the tail portion of the battery which favors complete extraction of sugar from the outgoing cossettes. Thus at this tail portion the liquid aqueous phase is mostly the incoming sugar-free water and hence sugar concentration is very low and residual sugar in the cossettes is subjected to a pressure differential conducive to diffusion of the sugar from the cossettes into the surrounding aqueous phase. The net result is that the outgoing cossettes have a lesser content of sugar than in conventional practice. It is further to be observed that in conventional practice the condensate, make-up and press water are introduced together at the tail end so that in this section of the battery there is an appreciable concentration of sugar in the aqueous phase (brought in by the press water) and hence the pressure differential potentially capable of causing sugar to diffuse out of the cossettes is lessened with the net result that the outgoing cossettes still contain considerable sugar.

This embodiment of the invention is further explained making reference to FIG. 2 in the annexed drawing. The cossettes are introduced at the head end 2 of diffuser 1 and the spent cossettes (pulp) are discharged at the tail end 3. The pulp then enters press 7 where it is subjected to compression and the resulting press water is conducted by conduit 8 and inlet 9 into diffuser 1 at a point where the cossettes therein have a greater concentration of sugar than contained in the press water. The main source of water (condensate plus make-up water) is introduced in the usual way at the tail end 3 of the diffuser through conduit 10. The juice produced by the diffusion is discharged by conduit 6 at the head end of the diffuser.

There has been described above the application of the invention in a specific field, namely the diffusion of sugar beets, and with the view of decreasing the content of undesirable dissolved material (mineral salts) in the juice or with the view of increasing the total amount of sugar extracted from the beets. It is obvious, however, that the invention is not restricted to this particular commodity nor is it restricted to secure the particular aims cited above. In its broad aspect, the principles of the invention are applicable to countercurrent extraction of any type of vegetable material and the aim of the extraction may be the purpose of recovering or removing from the vegetable material any component which is soluble in the solvent selected. Thus, typical of the materials to which the invention is applicable are, by way of example, sugar beets, sorghum, sugar cane, apples, carrots, potatoes and other tubers, cereal grains, oil seeds, waste products from canneries such as fruit pomaces, or citrus peels, distillation residues and the like. The type of solvent used depends, of course, on the nature of the component desired to be extracted and would include water for sugar, pectin, fruit acids, and similar water-soluble materials; organic solvents such as alcohols, petroleum solvents, hexane etc. for extracting oils, flavor components, oil-soluble vitamins, pigments or other components soluble in the chosen solvent. In a broad sense, the invention includes two distinct aspects or modifications. The first modification is applicable in situations where a part of the available solvent contains undesired dissolved material. The amount of this undesired material which ends up in the final extract is reduced by applying the two sources separately and at different locations along the length of the countercurrent extraction apparatus. Thus the impure solvent (the one containing the undesired dissolved material) is introduced at the tail end of the apparatus while the pure solvent is introduced at a point spaced from the tail end in a direction toward the head end, the exact location of this inlet being in any particular case dictated by the particular factors such as concentrations and relative amounts of solvents available for use. By such separate and spaced introduction of the solvent streams the amount of undesired material which ends up in the final extract is decreased, as explained above in connection with decreased mineral content in sugar beet extraction. The second modification of the invention is applicable in situations where a part of the available solvent contains desired dissolved material. The amount of this material which ends up in the final extract is increased by applying the two sources separately and at different locations along the length of the countercurrent extraction apparatus. Thus the regular solvent (that which does not contain the desired dissolved material) is introduced at the tail end of the apparatus while the solvent containing dissolved material is introduced at the point spaced from the tail end in a direction toward the head end. The exact location of this inlet in any particular case is governed by the particular factors of the operation such as concentrations of dissolved material in the available solvents and the relative amounts of each. By such spaced and separate introduction of the solvent streams, the amount of desired material which ends up in the final extract is increased, as explained above in connection with efficient re-use of press water in sugar beet diffusion.

It is evident from the foregoing explanation that in its broad aspects the process of the invention provides a means for controlling the composition of extracts produced in countercurrent extractions by separately introducing in spaced relationship the several sources of solvent applied to the extraction. It is, moreover, to be realized that the expressions "desired material" and "undesired material" may have different connotations depending on the particular system to which the invention is applied. For example, in extracting sugar beets to recover sugar, a recirculating liquor containing dissolved sugar may be regarded as containing a desired material whereas in a process of extracting fruit pomace to recover fruit acids, a recirculating liquor containing dissolved sugar may be regarded as containing an undesired material, in this particular circumstance. It is also evident that in any commercial operation of a countercurrent extraction there will always be various liquors produced at different stages in the process as condensed overheads from distillations, mother liquors from crystallizations, wash liquors from filter presses, etc., all of which contain some solvent plus greater or lesser amounts of dissolved materials. By applying the principles of this invention such liquors can be recirculated back to the extraction system to attain more efficient and effective operations.

*Example*

The invention is further demonstrated by the following illustrative example:

The diffusions described below were conducted in a laboratory-scale continuous countercurrent diffuser. This device consists essentially of a 4-foot trough, U-shaped in cross-section, provided with an interrupted-flight helical scroll for propelling the cossettes through the trough. The diffusions were carried out at a temperature of 70° C.

The first run was carried out in accordance with the invention whereas the second run was in accordance with conventional practice. The second run is thus not illustrative of the invention but is included for comparative purposes.

*Run 1.*—Fresh beet cossettes were fed into the diffuser at the rate of 9 kg./hr. Pulp was discharged at the rate of 6.6 kg./hr.

Water supplied to the diffuser was (1) distilled water—introduced at the rate of 6 liters/hr. through an inlet spaced from the tail end of the diffuser a distance of one-third of the effective length of the diffuser—and (2) a solution of sodium chloride in water (30.74 grams Cl⁻ per liter) introduced at the tail end at the rate of 6 liters/hr. Output of juice was 12.5 liters/hr.

After the system had reached equilibrium, it was operated about 4 hours, the pulp and juice being collected, weighed and analyzed to determine the amounts of chloride ion and concentration of sugar.

*Run 2.*—The process as described above was repeated except that the two water sources (distilled and saline water) were mixed and fed into the diffuser at the tail end.

The results are tabulated below:

|  | Run 1 Process of invention | Run 2 Not in accordance with invention |
| --- | --- | --- |
| Amount of Cl⁻ in juice, percent, based on total amount of Cl⁻ in saline water | 13.8 | 46.5 |
| Amount of Cl⁻ in pulp, percent, based on total amount of Cl⁻ in saline water | 86.2 | 53.5 |
| Concentration of sucrose in pulp, percent | 0.32 | 0.21 |

The most significant figures in the above table are those relating to the amount of chloride ion which ends up in the juice product. Thus in Run 1, in accordance with the invention only 13.8% of the total amount of chloride ion was contained in the juice. On the other hand, in Run 2 with the usual mixing of the water supplies, 46.5% of the total chloride ion was present in the juice product.

Having thus described the invention, what is claimed is:

1. In a countercurrent extraction process wherein a vegetable material is moved through an extraction zone in a direction from the head end of the zone to the tail end of said zone, while a solvent is concomitantly moved through the extraction zone in the opposite direction and wherein the total solvent for the extraction includes (*a*) solvent containing dissolved material and (*b*) solvent relatively free from dissolved material, the improvement which comprises feeding the said solvents separately into the extraction zone, solvent (*a*) being introduced at the tail end thereof and solvent (*b*) being introduced at a point spaced from the tail end in a direction toward the head end, whereby to reduce the amount of dissolved material which is contained in the extract produced by the process.

2. In a countercurrent extraction process wherein sugar beet cossettes are moved through an extraction zone in a direction from the head end of the zone to the tail end of said zone while water is concomitantly moved through the extraction zone in the opposite direction and sugar-containing extract is discharged from the tail end of the extraction zone and wherein the total water for the extraction includes (*a*) water containing dissolved mineral salts and (*b*) water relatively free from mineral salts, the improvement which comprises feeding said water supplies separately into the extraction zone, water (*a*) being introduced at the tail end thereof and water (*b*) being introduced at a point spaced from the tail end in a direction toward the head end, whereby to decrease the amount of mineral salts which is contained in the said extract.

3. In a countercurrent extraction process wherein a vegetable material is moved through an extraction zone in a direction from the head end of the zone to the tail end of said zone while water is concomitantly moved through the extraction zone in the opposite direction and aqueous extract is discharged from the tail end of the extraction zone and wherein the total water for the extraction includes (a) water containing dissolved material and (b) water relatively free from dissolved material, the improvement which comprises feeding said water supplies separately into the extraction zone, water (a) being introduced at the tail end thereof and water (b) being introduced at a point spaced from the tail end in a direction toward the head end, whereby to decrease the amount of said dissolved material which is contained in the said extract.

References Cited in the file of this patent

UNITED STATES PATENTS

| | | |
|---|---|---|
| 1,114,018 | Moore | Oct. 20, 1914 |
| 2,273,557 | Bonotto | Feb. 17, 1942 |
| 2,614,911 | Bonotto | Oct. 21, 1952 |

FOREIGN PATENTS

| | | |
|---|---|---|
| 813,394 | Great Britain | May 13, 1959 |